Dec. 3, 1963   S. P. KINNEY   3,113,168
FURNACE GAS CLEANING AND COOLING APPARATUS
Filed July 2, 1957   2 Sheets-Sheet 1
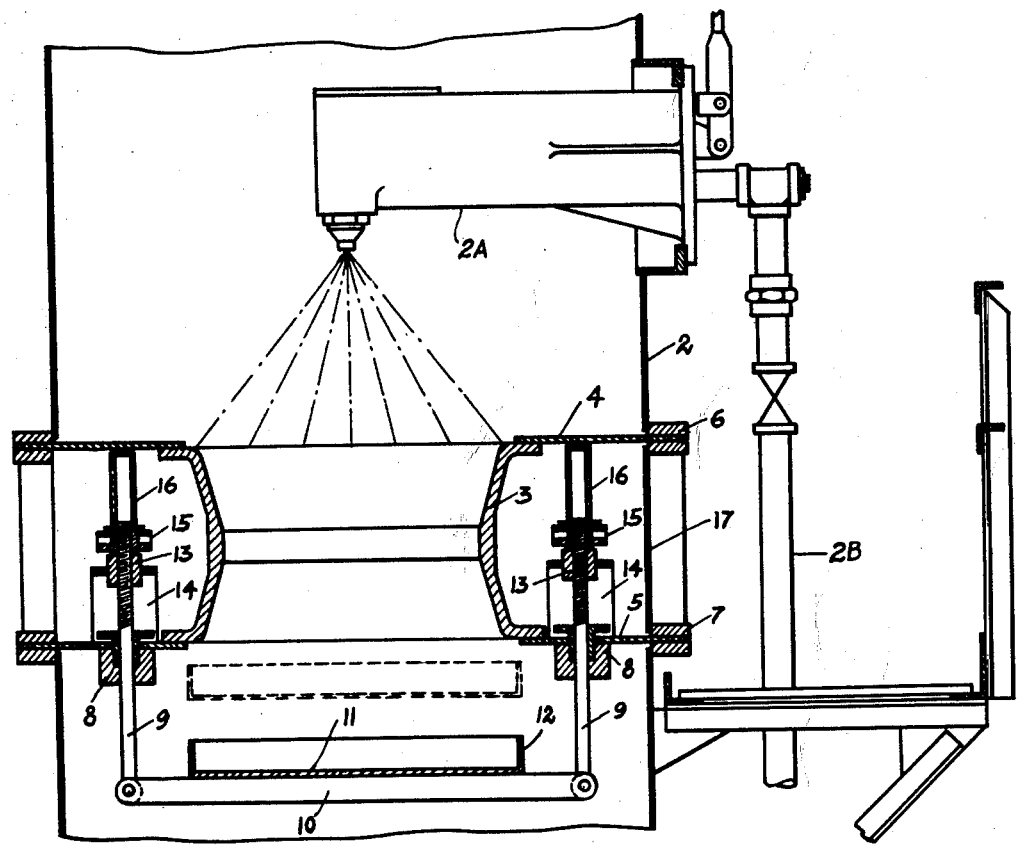
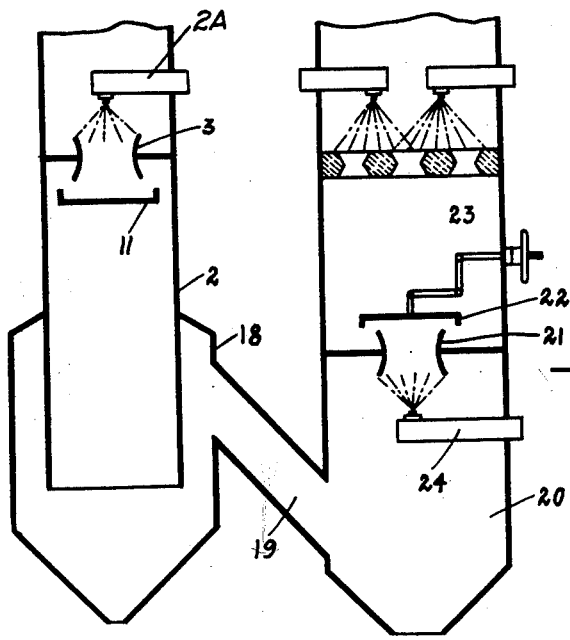
Fig.1.
Fig.3.
INVENTOR.
SELWYNE P. KINNEY.
BY
Christy, Parmelee & Strickland
ATTORNEYS.

Dec. 3, 1963 S. P. KINNEY 3,113,168
FURNACE GAS CLEANING AND COOLING APPARATUS
Filed July 2, 1957 2 Sheets-Sheet 2

INVENTOR.
SELWYNE P. KINNEY.
BY
Christy, Parmelee - Strickland
ATTORNEYS.

United States Patent Office 3,113,168
Patented Dec. 3, 1963

3,113,168
FURNACE GAS CLEANING AND COOLING APPARATUS
Selwyne P. Kinney, Pittsburgh, Pa., assignor to S. P. Kinney Engineers, Inc., Carnegie, Pa., a corporation of Pennsylvania
Filed July 2, 1957, Ser. No. 669,667
4 Claims. (Cl. 261—22)

This invention is for apparatus for cleaning or cooling or cleaning and cooling blast furnace gas in advance of introduction into a gas washer or precipitator.

Blast furnace gas normally carries a considerable amount of fine solid particles or dust. The conventional treatment of the gas is to first put it through a dust collector which is effective to remove a certain proportion of the solids, particularly the larger dust particles. In some cases it is then passed into the bottom of a gas washer. This is a cylindrical tower with separated courses of tile through which the gas flows while water is sprayed over the tiles, flowing downwardly counter to the flow of gas. Sometimes the gas may then flow to an electrostatic precipitator, or such a precipitator may be positioned in the top of the washer tower, or the precipitator may be used without the conventional washer.

It has heretofore been proposed to place a venturi or an orifice plate in the duct between the dust collector and the gas washer to establish a pressure drop and increase the velocity of the gas in flowing through the venturi and to inject water into the gas stream in the venturi. The high velocity, the confining of the gas stream to a smaller passageway, and the subsequent expansion of the gases after leaving the venturi effectively contact the gas-entrained dust with the water or water vapor and the dust is deposited while the gas is diverted to a washer or other apparatus for further treatment. Extensive experiments conducted under my supervision have disclosed that there is an important inverse relation between the speed of gas flow through the venturi and the amount of water required for dust removal. For example, with a gas velocity of 126 feet per second in the throat of the venturi, 10.5 gallons of water per 1000 cubic feet of gas reduced the burden of dust from about .400 grain per cubic foot to .036 grain, whereas with the gas flowing through the throat of the venturi at a velocity of 625 feet per second, 2 gallons of water per 1000 cubic feet of the same gas reduced the dust to the range of .035 to .024 grain per cubic foot of gas. In other words, the increase in velocity effected a substantial reduction in the water requirement while cleaning the gas just as effectively. Little advantage appears to be gained by further increase of velocity, while there is a disadvantage in further increasing the back pressure on the gas.

A difficulty with the cleaning of blast furnace gas is the variation in gas flow. The blast furnace may operate at full or normal capacity for a period of time producing maybe 100,000 cubic feet of gas per minute, and then its production may be reduced to say 50,000 or 60,000 cubic feet per minute. A venturi that produces the high velocity for full-scale operation, produces a much lower velocity of gas flow at the lower rate of operation. The venturi cannot be changed to operate efficiently over this range of gas flow.

The present invention has for its object to make a venturi designed to function with the maximum expected gas volume also perform effectively with a much lesser volume of gas by adjustably opening or closing the discharge end of the venturi. The high velocity found necessary for cleaning the gas with a small amount of water is under these conditions obtained at the discharge side of the venturi instead of the venturi throat.

A further object of the invention is to use two such units in succession, one primarily for cleaning the gas and the second for cooling the gas, the combination enabling a much smaller or more compact gas washer to be used.

These and other objects and advantages are secured by my invention as will appear from the following description in conjunction with the drawings, in which:

FIG. 1 is a vertical section through a section of pipe leading from a conventional dust collector (not shown) to a gas washer with my invention built into the pipe section;

FIG. 3 is a schematic view showing the relation of the pipe section of FIG. 1 to the gas washer, and showing a second unit in the bottom of the gas washer, this unit being inverted with respect to the first.

Figure 2:
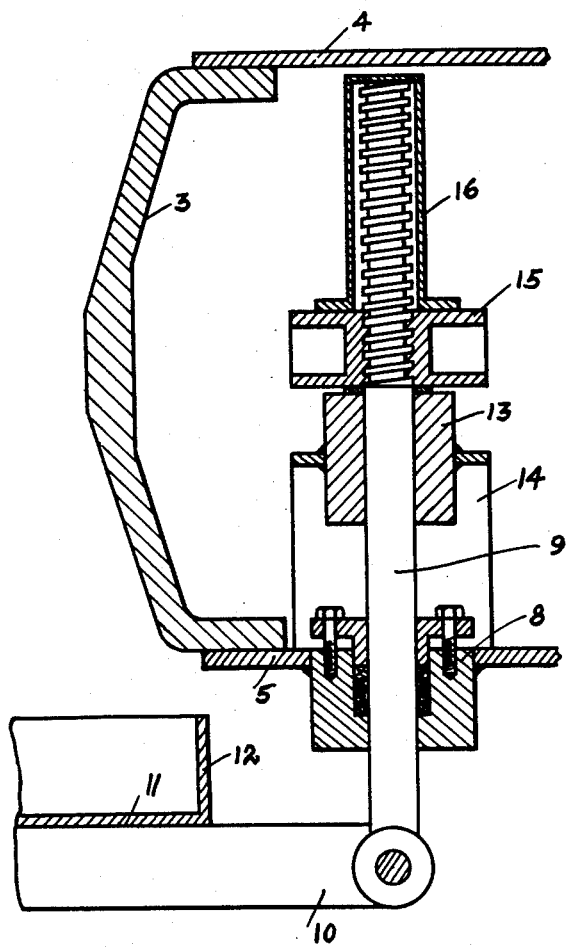
FIG. 2 is a detail view of the adjusting screw arrangement for the adjusting plate, the view being a fragmentary vertical section on a larger scale than FIG. 1.

Referring first to FIG. 1, 2 designates a metal duct such as that used in carrying gas from a blast furnace dust collector to the bottom of a gas cleaner such as a washer or precipitator. The flow of gas is down. According to my invention a section of this pipe is replaced by a flow-restricting device or orifice, preferably a short modified venturi 3 which is mounted in the pipe section by plates 4 and 5 confined between flanges at 6 and 7 respectively so as to be gas-tight, these plates having openings at their centers so as not to obstruct the top and bottom of the venturi 3.

At two diametrically opposite locations, the plate 5 is provided with a gland 8 through which passes a rod 9. The lower ends of these rods are connected by a cross bar 10. On the cross bar 10 there is a cap or valve member 11 here shown in the form of a disk having an upturned peripheral flange 12. Its diameter is slightly greater than the discharge end of the venturi so if it is raised above the dotted line position shown in FIG. 1 it could substantially completely close the flow of gas through the venturi by the flange 12 contacting the underside of plate 5.

The upper ends of the rods 9 have means for raising and lowering them attached thereto. For this purpose I have shown a manual adjustment, but any other suitable operating device may be employed. The adjustment shown is one wherein each rod 9 passes through a guide 13 carried on an arched support 14 welded to the top of plate 5. Above the guide the rod is threaded and there is a nut 15 that rests on the top of the guide 13, this nut having openings to receive a bar or spanner wrench for turning it. On the nut is a protecting tubular cover 16 with a closed upper end. There are supports 17 at intervals between the flanges 6 and 7 to form a weight transmitting connection between the pipe above and below the venturi, but which leave adequate open area for access to the adjusting nuts.

Extending through the pipe 2 above the venturi is a nozzle 2A that projects a conical spray of water into the top of the venturi. The nozzle shown is a self-cleaning nozzle as described in Kinney et al. Patent No. 2,647,799, granted August 4, 1953, and 2B indicates a water supply line leading thereto.

In operation, gas flows down the pipe 2. The restricted passage provided by the venturi creates a pressure drop when the gas is flowing at or near normal rated capacity of the furnace, so that the velocity of the gas is greatly accelerated, preferably to a velocity of around 625 feet per second. Water at the rate of around 2 gallons per 1000 c.f.m. of gas is sprayed into the venturi from nozzle 2A. The gas is quite hot, being in the neighborhood of 600° F. The water is vaporized but it is under this velocity extremely effective in bringing fine dust particles into a condition where they agglomerate and fall out of the main gas stream. At this time the valving element 11 is dropped to its lowest point, and save for the impingement of the gas stream against it, it does not otherwise restrict gas flow. It does, however, in all positions, desirably baffle the straight line flow of the gas laterally so that dust particles are more readily dropped out.

However, if the furnace is operated at below normal capacity, as is often the case, the volume of gas decreases and the velocity attained in the venturi throat is no longer sufficient to achieve this velocity and substantially more water would be required. To offset the decrease in gas flow, the cap 11 is raised and as the flange approaches the bottom plate 5, the area of gas flow is increasingly restricted and a high velocity is attained between the bottom of the venturi and the flange. This appears to be equally effective. By turning the adjusting nuts this can be closely regulated to the extent required and held until further change is required.

FIG. 3 discloses a typical installation utilizing the apparatus shown in FIGS. 1 and 2. In this view the venturi and adjustable cap at the discharge end are only schematically illustrated. The pipe 2 discharges into a receiver 18 of somewhat larger diameter, this receiver having a conical bottom with a valved outlet through which condensate and dust may be withdrawn. The casing of the chamber 18 extends well above the bottom of the tube 2 and near the top of the casing 18, above the bottom of the down pipe 2, there is a downwardly-sloped duct 19 that leads into the bottom of a gas washer or electrostatic precipitator. I have shown that duct 19 as opening into the bottom of a gas washer designated 20, and at 21 I have schematically illustrated a second venturi with a cap 22 adjustable through mechanism 23 at the exterior of the cylindrical walls of the gas washer. There is a nozzle 24 which projects its spray upwardly into the venturi, the position of the parts being reversed with respect to that shown in FIGS. 1 and 2. Since a large amount of the dust can be removed by the spray process accomplished in the venturi 3, the second unit is of primary importance for cooling the gases, although it may be effective to further remove some of the dust. By injecting water into the high velocity stream, the water is almost instantly vaporized and of course the latent heat of vaporization is effective to accomplish this cooling. The volume of gases by being cooled is reduced while the steam which is generated quickly condenses higher up in the washer. The washer may be provided with one or more courses of hollow tiles through which the gases pass, with spray nozzles above these tiles which further cool the gas, wash down the dust and any condensate that clings to the tiles. Because of the effectiveness with which the first venturi unit removes the dust and the efficiency of the cooling, the washer tower itself may be substantially smaller than gas washers presently provided for taking care of blast furnace gas. The use of the adjustable cap in the second unit is of advantage in maintaining a velocity of gas flow when the volume of gas is below normal adequate to entrain the water until it is vaporized, and it thereby makes the second unit more effective for removing dust that has escaped the first unit.

Moreover, the cap or baffle again diverts the flow of gas laterally so that a high velocity stream is not projected up into the washer.

A venturi such as the venturi 3 shown in FIG. 1 provides a restricted passageway that accelerates the rate of flow of gas through it, and it is subject to little abrasion from the dust particles. However this opening does not have to be provided by a venturi, and the cap 11 can be raised and lowered to throttle the flow whether the venturi is used or whether the opening in the partition separating the two parts of the duct is of some other contour.

Various other changes and modifications may be made in the construction and arrangement of parts within the contemplation of my invention and under the scope of the following claims.

I claim:

1. The combination with a gas washer for blast furnace gases and a duct extending downwardly along the outside of the washer for conveying gases from a blast furnace to the washer, the duct being of smaller diameter than the washer so that a higher gas velocity is maintained therein than in the washer, of an expansion chamber at the bottom of the duct in which the duct projects and terminates, a second duct leading from the upper portion of the expansion chamber at a level above the level at which the first duct terminates into the lower portion of the gas washer, means providing a restricting orifice in the said first duct for increasing the velocity of gas flow through the orifice, a nozzle in the duct above the orifice positioned to project a spray of water through the orifice, means at the bottom of the expansion chamber for carrying away water and entrained solids discharged by the action of said spray into the gas at the orifice, whereby a substantial volume of dust is removed from the gas before it enters the washer, means at the outlet side of said restricting orifice for varying the pressure drop between the upstream and downstream sides of the orifice whereby the impedance to gas flow through the said orifices may be increased as the gas volume decreases and decreased as the gas volume increases to maintain the velocity of the gas in a controlled range, and means accessible at the exterior of said first-named duct for adjusting said last-named means.

2. The combination defined in claim 1 wherein there is a second means in the lower part of the gas washer above the point where said last-named duct leading from the expansion chamber to the washer opens into the washer and through which the velocity of the gas flow is again increased, a spray nozzle below said second means for directing a spray of water upwardly into it to further cool the gas, a baffle above the second means for diverting the upward flow of the gas, and means accessible at the exterior of the washer for adjusting the baffle with relation to the second means and throttle of the gas flow through said second means.

3. Apparatus for use with a blast furnace gas washer for the preliminary scrubbing and cooling of hot blast furnace gas before it enters the washer, said apparatus comprising a gas conveyor duct section adapted to be connected into a gas main leading from a blast furnace to the inlet of the gas washer with which the apparatus is to be used, means in the duct providing a passage of restricted diameter less than the diameter of the duct to produce a pressure drop between the upstream and downstream sides thereof and increase the velocity of gas flow as it passes therethrough, a water spray nozzle positioned upstream of said means for projecting an expanding spray of water axially of the duct into the upstream opening of said passage of the flow-restricting means, there being an unrestricted open space in the duct between the nozzle and the entrance end of said passage whereby the hot gases may flow freely into said passage through the expanding spray of water and vaporize the water, adjustable means at the outlet side of said passage for selectively varying the pressure drop through said means, and means accessible at the exterior of the duct for adjusting said last-named means.

4. Apparatus for use with a blast furnace gas washer for the preliminary scrubbing and cooling of hot blast furnace gas before it enters the washer, said apparatus comprising a gas conveying duct adapted to be connected into a gas main leading from a blast furnace to the inlet of the gas washer with which the apparatus is used, and of the same diameter as the main into which it is connected, a venturi in the duct having open ends with a restriction between the open ends, the upstream end of the venturi opening into the full diameter of the duct both radially and axially thereof, means in the downstream outlet of the venturi for adjustably impeding the flow of gas through the venturi, and a spray nozzle upstream from the upstream end of the venturi in spaced relation to the upstream end thereof arranged to direct a conical spray of water over the entire upstream opening of the venturi whereby gas flowing into the opening of the venturi flows first through said spray whereby water is vaporized by the heat of the gases and enters the venturi as steam.

References Cited in the file of this patent

UNITED STATES PATENTS

| | | |
|---|---|---|
| 1,100,034 | Swem | June 16, 1914 |
| 1,121,394 | Patten | Dec. 15, 1914 |
| 2,088,691 | Dill | Aug. 3, 1937 |
| 2,284,317 | Greenberg | May 26, 1942 |

FOREIGN PATENTS

| | | |
|---|---|---|
| 28,295 of 1904 | Great Britain | Oct. 5, 1905 |